US009645778B2

(12) United States Patent
Chatow et al.

(10) Patent No.: US 9,645,778 B2
(45) Date of Patent: May 9, 2017

(54) SYSTEM AND METHOD OF SORTING PRINT JOBS FOR A PLURALITY OF PRINT SERVICE PROVIDERS

(75) Inventors: Ehud Chatow, Palo Alto, CA (US); Steven J. Simske, Fort Collins, CO (US); Benjamin I. Dempster, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 518 days.

(21) Appl. No.: 13/383,566

(22) PCT Filed: Sep. 14, 2009

(86) PCT No.: PCT/US2009/056866
§ 371 (c)(1),
(2), (4) Date: Jan. 11, 2012

(87) PCT Pub. No.: WO2011/031275
PCT Pub. Date: Mar. 17, 2011

(65) Prior Publication Data
US 2012/0154866 A1    Jun. 21, 2012

(51) Int. Cl.
*B41J 11/44*    (2006.01)
*G06F 3/12*    (2006.01)

(52) U.S. Cl.
CPC .......... *G06F 3/1262* (2013.01); *G06F 3/1211* (2013.01); *G06F 3/1218* (2013.01); *G06F 3/1288* (2013.01)

(58) Field of Classification Search
CPC ...................................................... G06F 3/126
See application file for complete search history.

(56) References Cited

U.S. PATENT DOCUMENTS

| 6,453,361 | B1 | 9/2002 | Morris |
| 7,148,985 | B2 | 12/2006 | Christodoulou et al. |
| 2002/0019786 | A1* | 2/2002 | Gonzalez et al. ............ 705/28 |
| 2002/0026379 | A1* | 2/2002 | Chiarabini et al. ............ 705/26 |
| 2002/0122204 | A1 | 9/2002 | Van Der Meijs |

(Continued)

OTHER PUBLICATIONS

International Search Report and Written Opinion for PCT Application No. PCT/US2009/056866, Korean Intellectual Property Office, May 31, 2010.

*Primary Examiner* — Moustapha Diaby
(74) *Attorney, Agent, or Firm* — Thorpe, North & Western L.L.P.

(57) ABSTRACT

The present disclosure is directed systems and methods of sorting print jobs for assignment to a plurality of print service providers. In one aspect, such a method can include receiving at a print server a plurality of print jobs having a plurality of print parameters from a plurality of users, where individual print jobs have multiple print parameters being represented in a portion of the plurality of print jobs. The method can further include selecting a prioritization factor, identifying a plurality of print service providers having at least partially different printing configurations, sorting the plurality of print jobs into a plurality of print job groupings based on common printing parameters and the prioritization factor, and sending the plurality of print job groupings to the plurality of print service providers to achieve the common print parameters and the prioritization factor.

20 Claims, 2 Drawing Sheets

(56) References Cited

U.S. PATENT DOCUMENTS

| | | |
|---|---|---|
| 2004/0145772 A1 | 7/2004 | Stringham |
| 2005/0002058 A1 | 1/2005 | Hirabayashi |
| 2005/0111030 A1 | 5/2005 | Berkema et al. |
| 2005/0147440 A1* | 7/2005 | Nakanishi et al. ............ 400/62 |
| 2006/0039707 A1* | 2/2006 | Mima ............................ 399/23 |
| 2007/0019228 A1* | 1/2007 | Rai et al. ..................... 358/1.15 |
| 2007/0019233 A1 | 1/2007 | Rai et al. |
| 2007/0236725 A1* | 10/2007 | Harmon et al. ............. 358/1.15 |
| 2007/0274751 A1 | 11/2007 | Ushio |
| 2008/0204772 A1 | 8/2008 | Kauffman |
| 2009/0055772 A1 | 2/2009 | Huang |
| 2009/0138878 A1 | 5/2009 | Fernstrom et al. |
| 2009/0201531 A1* | 8/2009 | Pandit et al. ................ 358/1.15 |
| 2010/0265529 A1* | 10/2010 | Katano ........................ 358/1.14 |

* cited by examiner

SYSTEM AND METHOD OF SORTING PRINT JOBS FOR A PLURALITY OF PRINT SERVICE PROVIDERS

CLAIM FOR PRIORITY

The present application is a national stage filing under 35 U.S.C 371 of PCT application number PCT/US2009/056866, having an international filing date Sep. 14, 2009, which is incorporated by reference in its entirety.

BACKGROUND

Many forms of printing have been developed that utilize a variety of printing materials, including numerous inks, toners, printing substrates, adhesives, coatings, and other specialty materials. In addition, many printing jobs have become increasingly complex. Printers and the associated setup and maintenance of printers have increased as the complexity of such printing jobs has increased. In other words, as the setup and maintenance of printers affect the cost of printing many types of print jobs, and as some print jobs utilize specialty materials, such as adhesives and special coatings, which can be costly to implement, particularly in situations where such specialty printing is not commonplace, it may be desirable to group these jobs in certain circumstances.

DETAILED DESCRIPTION

Figure 1:
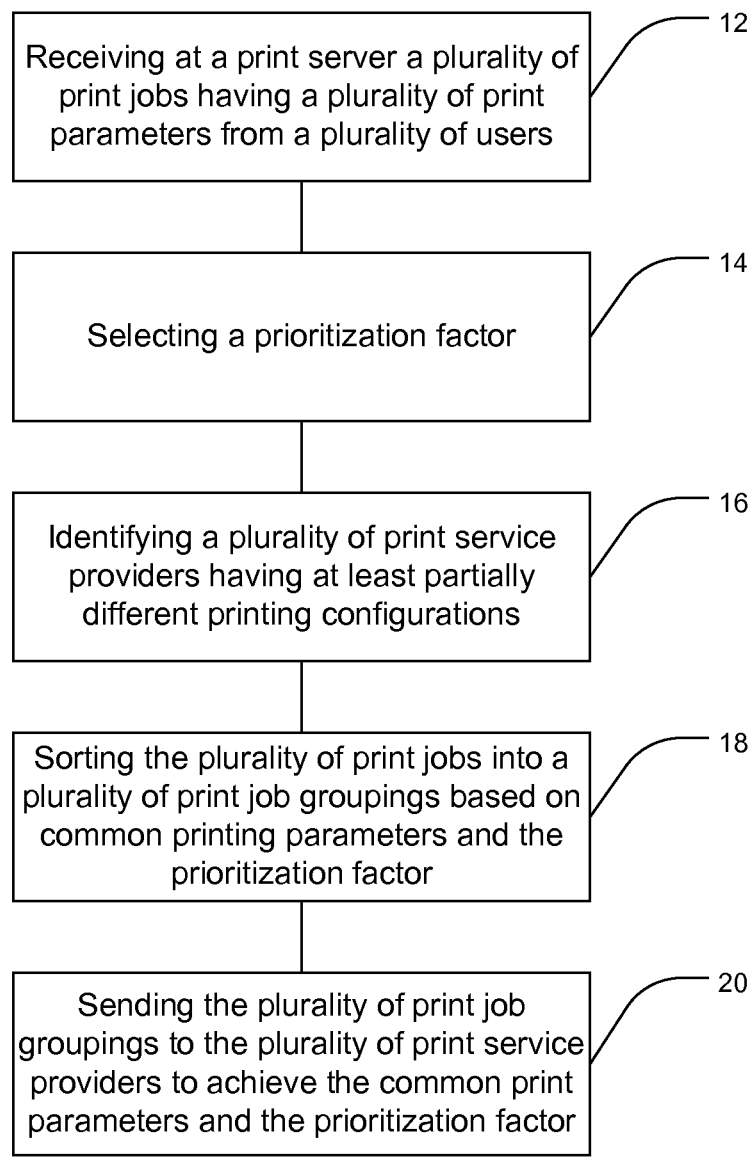
FIG. 1 depicts a method for sorting print jobs to a plurality of print service providers in accordance with one embodiment of the present disclosure.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is noted that, as used herein, the singular forms of "a," "an," and "the" include plural referents unless the context clearly dictates otherwise. Thus, for example, reference to "a document" includes one or more of such documents, reference to "an amount of toner" includes reference to one or more amounts of toners, and reference to "the printer" includes reference to one or more printers.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, the term "print service provider" or "PSP" refers to an entity that is capable of receiving a print job, printing the print job, and delivering the print job. A printing entity having multiple individual printers would not generally be considered to be multiple print service providers based on the number of individual printers.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

The present disclosure is directed to systems and methods for sorting print jobs to a plurality of print service providers (PSPs) in a manner that achieves a printing goal. This printing goal, or prioritization factor, can provide a meaningful benefit that arises from how print jobs are grouped together and to which PSPs these groups are sent. In other words, incoming print jobs are sorted based on established printing configurations or capabilities of the various associated PSPs in a manner that achieves the printing goal. Thus, print jobs are grouped based on various common print parameters, which can include not only the desired printing characteristics of the print jobs such as print media, inks, coatings, or the like, but also any additional printing needs such as time to completion of the print job or overall print cost. In such cases, costs associated with printing can be minimized by grouping similar print jobs, particularly for those that are of a small size or have special print parameters. For example, wedding announcements can be expensive to print because they are often smaller print jobs and can be printed on specialty paper. Often, wedding announcements can also be of an unusual size. By grouping wedding announcement print jobs from different users together, printing runs are larger, thus reducing printing costs. Additionally, further savings can be achieved by grouping wedding announcement print jobs by media and ink type. As another example, a food label may utilize a specific barrier layer, and a certain set of adhesives and substrates that are compatible with freezers and/or microwave ovens. Smaller runs of these type of print jobs may be relatively expensive, but if grouped together with others printing similar packaging, costs can be reduced for parties that are part of the printing group.

In one aspect of the present disclosure, as is shown in FIG. 1, a method of sorting print jobs to a plurality of PSPs is provided. Such a method can include receiving at a print server a plurality of print jobs having a plurality of print parameters from a plurality of users 12, where individual print jobs have multiple print parameters being represented in a portion of the plurality of print jobs. The method can also include selecting a prioritization factor 14, identifying a plurality of PSPs having at least partially different printing configurations 16, and sorting the plurality of print jobs into a plurality of print job groupings based on common printing parameters and the prioritization factor 18. Additionally, the method can include sending the plurality of print job groupings to the plurality of PSPs to achieve the common print parameters and the prioritization factor 20. In a further aspect, the plurality of print job groupings can be printed by the associated printer(s).

Figure 2:
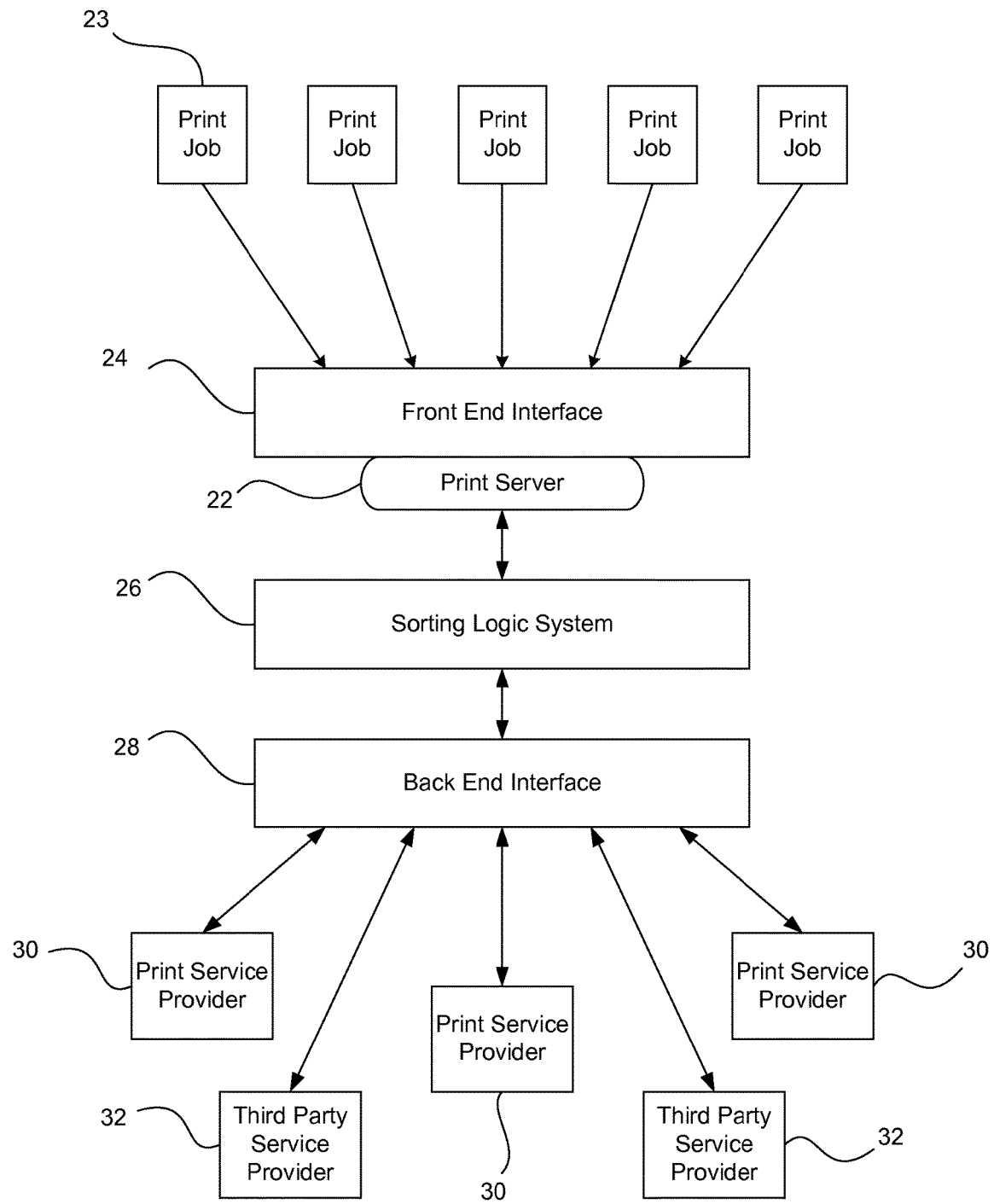
FIG. 2 depicts a system for sorting print jobs to a plurality of print service providers in accordance with another embodiment of the present disclosure.

The present disclosure additionally provides systems for sorting print jobs to a plurality of PSPs. As is shown in FIG. 2, such a system can include a print server 22 and a front end interface 24 functionally coupled to the print server. In some aspects, the print server can be the front end interface. The front end interface is operable to receive a plurality of print jobs 23 from a plurality of users. Additionally, the print jobs have a plurality of print parameters, and individual print jobs have multiple print parameters that are represented in a portion of the plurality of print jobs. The system can further include a sorting logic system 26 that is functionally coupled to the print server, and a back end interface 28 that is functionally coupled to the sorting logic system. The back end interface is operable to receive printing configurations from a plurality of PSPs 30 utilizing the back end interface, thus in some aspects the backend interface facilitates a two way communication between the sorting logic system and the PSPs. The sorting logic system is operable to sort the plurality of print jobs into print job groupings, and to route print job groupings to individual PSPs having printing configurations matching the multiple print parameters and, in some cases, that are capable of achieving any associated printing goals. In addition to PSPs, the back end interface can also be operable to receive service offers and to communicate with third party service providers 32.

The two-way communication between the sorting logic system and the PSPs can be beneficial in achieving the printing goals of the user. By receiving the printing configurations of the individual PSPs, the sorting logic system can more effectively group the print jobs into efficient print jog groupings. Additionally, printing availability can be transmitted from the individual PSPs to the sorting logic system, thus allowing job completion and scheduling estimates to be made.

In addition to PSPs, the backend interface can allow other third party service providers to offer services. For example, in one aspect a third party service provider can offer marketing services. These services could include offers to provide branded materials to be used in the printing process. Thus wedding announcements could be printed on paper that included the branding of a national diamond retailer.

The methods of receiving the print jobs at the front end interface can vary depending on a variety of factors. For example, in one aspect the print jobs can be received from a user at the location of the print sorting. This can occur via the physical transfer of some form of electronic media such as a flash drive, floppy disk, compact disk, DVD, and the like. Such a method can involve an exchange of the media, or in some aspects, print jobs can be uploaded to the front end interface by the user at the location of the print sorting. Thus the print jobs can then be sorted, grouped into print job groupings, sent to a PSP, and returned to the user at a later time.

In another aspect, users can upload print jobs to the front end interface via a network connection. Such a network connection can include connections to networks such as local networks, ad hoc networks, cellular networks, the internet, and the like. Such networks can also include wired or wireless networks. Thus the print jobs can be received at the front end interface from such a network connection, sorted into print job groupings, and sent to a PSP for printing and delivery back to the user. In some aspects, the PSP can print the print jobs and send them back to the print sorting location for subsequent delivery.

The back end interface thus functions as a network of print and other service providers that can be utilized in order to reach a given printing goal or prioritization factor. Because the sorting logic system can compare the printing configurations or capabilities of a plurality of PSPs, print jobs can be effectively grouped into print job groupings and sent to particular PSPs in a manner that achieves the printing goals of the user and or the printing goals of the entity sorting the print jobs. In addition, this comparison of PSPs can allow a higher level of competition between service providers, which can thus translate into greater printing savings for a user. PSPs can also benefit from print jobs using fewer resources due to such job grouping and targeted printing. It should also be noted that, in some aspects, large print jobs from a single user can be broken up into smaller targeted print jobs and sent to different PSPs that can allow cost savings as compared to a single PSP printing the entire print job.

The sorting logic system is a computational device or system that is capable of retrieving print jobs and information regarding the print parameters of the print jobs from the frontend interface, sorting the print jobs into print job groupings based on print parameters and a prioritization factor, querying and selecting appropriate PSPs to accomplish printing goals, and sending the print job groupings to individual PSPs. Thus the sorting logic system is in communication with the front end interface, the back end interface, and any print server that can be present. In aspects utilizing a separate print server, the sorting logic system is operable to retrieve print jobs from the print server in order to form print job groupings for subsequent printing. In one aspect, the sorting logic system can retrieve all or substantially all of the print jobs that are resident on the print server. In such a case, the sorting logic system can sort all or substantially all of the print jobs into print job groupings for printing. As the print job groupings are sent on to individual PSPs, any ungrouped print jobs can be retained by the sorting logic system, or they can be returned to the print server. In another aspect, the sorting logic system can retrieve print jobs from the print server as each print job is identified as belonging to a given print job grouping. These print jobs can be retrieved from the print server and sorted into groups as they are identified. Once a print job grouping is of a sufficient size, it can be sent to a PSP to be printed.

The sorting logic system can send the print job groupings to the PSPs via a number of communication pathways. For example, in one aspect, the sorting logic system communicates with individual PSPs via an internet connection. In such cases, the print jobs are sorted into print job groupings by the sorting logic system, and the resulting print job groupings are sent via an internet connection to the individual PSPs. It is also contemplated that the print job groupings can be sent to individual PSPs by other networks, such as cellular, satellite, cable, etc. Additionally, in some aspects, the sorting logic system can send print job groupings to individual PSPs via a combination of pathways. For example, the sorting logic system can send one print job grouping to a PSP via an internet connection, and the same sorting logic system can send another print job grouping to another PSP using another type of connection, such as a cellular network.

As has been described, one function of the sorting logic system is to analyze the print jobs being sorted, group the print jobs into useful print job groupings, and send the print job groupings to individual PSPs that can accomplish the print parameters of the print jobs and accomplish the prioritization factor. The prioritization factor can be important to the sorting of print jobs into print job groupings. The same set of print jobs can be alternatively sorted into multiple print job groupings due to the large number of possible print parameters and the various possible combinations. The prioritization factor allows sorting of print jobs into print job groupings that are meaningful to achieve specific printing goals. Although numerous prioritization factors are contemplated, non-limiting examples can include print job cost, print job time to completion, print job quality, print job size, print job sustainability, printing location, and combinations thereof. For example, if print job cost is selected as the prioritization factor, print jobs can be grouped into print job groupings that minimize printing costs. In one aspect this can be accomplished by grouping print jobs having similar print media and ink requirements into print job groupings for subsequent printing on individual printers or at PSPs that are configured to print such print jobs. As another example, if print job size is to be maximized as a prioritization factor, numerous smaller print jobs having similar print parameters can combined into print job groupings in order to reduce printing costs. Some delay can be incurred depending on the number of smaller print jobs having similar print parameters that are available, so such cost savings can come at a cost of time-to-completion of the print job. Smaller print jobs having quick turnaround requirements can be combined into common print job groupings. However, prioritizing based on print time can subsequently increase printing costs, depending on the availability of smaller print jobs.

Numerous methods of selecting the prioritization factor are contemplated. In one aspect, for example, the prioritization factor can be established prior to receiving print jobs. In another aspect, the prioritization factor can be established upon receiving and evaluating a plurality of print jobs in order to more effectively match the prioritization of printing with the various types of print jobs that have been received.

In one specific example, selecting the prioritization factor can include sorting the plurality of print jobs into alternative pluralities of print job groupings based on alternative groupings of common print parameters. In other words, the print jobs can be sorted into various alternative print job groupings to further evaluate various prioritization factors. A plurality of potential prioritization factors can be identified based on these alternative groupings of common print parameters. A prioritization factor can then be either automatically or manually selected. For manual selection, a user responsible for sorting the print jobs can be provided with the plurality of potential prioritization factors, and the resulting selected prioritization factor can then be received from the user for further sorting. In some aspects, the manual selection of the prioritization factor can be partially automated. For example, a plurality of potential prioritization factors can be identified, and one or more potential prioritization factors can be preselected and presented to the user for selection.

In some aspects of the present disclosure, sorting the plurality of print jobs into a plurality of print job groupings can be performed, at least in part, based on constraints associated with the print parameters of the print job. A constraint can be any print parameter or other factor that requires the print job to be printed at a particular PSP or particular type of PSP. For example, certain print jobs can have constraints such as shipping, timing, customer relationships, etc., that require location-specific printing. In another example a print job can require a specialized substrate, finish, or proprietary printing process or printing material that is available only at a specific PSP. Thus the sorting of print jobs can be dependent on any constraints that are present. These constraints can thus be accounted for first in the sorting process so that subsequent sorting prioritization would not interfere with these constraints.

Numerous print parameters are contemplated that can be utilized to sort the print jobs into print job groupings. It should be noted that any parameter pertaining to printing that is capable of benefiting the sorting process should be considered to be within the present scope. In one aspect, for example, print parameters can include, without limitation, print media, inks, toners, adhesives, coatings, print area, print layout, and combinations thereof. In some aspects, print parameters that that are more common may be less useful in the sorting process. For example, print jobs printed on plain media paper may or may not be useful for sorting print jobs into print job groupings, depending on the prioritization factor and the proportion of the total plurality of print jobs that are to be printed on such media. In some cases, print parameters such as adhesive printing can be used as an effective print grouping in order to send such print jobs to printers and PSPs capable of such specialty printing.

Following the determination of the various print parameters and prioritization factor or factors, the print jobs are sorted into print job groupings based on common print parameters and the selected prioritization factor(s), subject to any printing constraints that are present. For example, in one aspect the sorting of print jobs can include receiving a plurality of print parameters and a selected prioritization factor at a sorting logic system. The plurality of print jobs can then be sorted into the print job groupings based on the common print parameters of the print jobs and the prioritization factor by the sorting logic system. The sorting logic system can be fully automated, or it can include varying levels of manual control. Such manual input can be dependent on the experience of the user performing the operation. Due to the varying levels of experience of users, it is also contemplated that a sorting logic system can be fully automated with a manual override for at least a portion of the sorting process. For example, if a user recognizes that a constraint exists that has not been recognized, or a constraint that is not being properly fulfilled, that user can manually override the sorting system to facilitate the constraint. Thus a manual override allows a user to monitor the implementation of a priori constraints as well as the introduction of a posteriori constraints during the sorting process.

In one aspect, the print jobs can be sorted based on a weight factor. For example, a weight factor can be applied to each of the plurality of print parameters, and the plurality of print jobs can be sorted into the plurality of print job groupings according to the weight factor.

In some cases a user interface associated with the sorting system can provide the user with various questions to assist the process. These questions can direct a user to make appropriate sorting decisions based on the print parameters of the print jobs and the prioritization factor. For example, a specific label that goes on a food product often needs a specific barrier layer and a certain set of substrates and adhesives that are used in freezer and microwave oven situations. The selection of such can be accomplished via a guided set of questions. Thus the user interface can map high level concerns, such as various finishing reagents, processes, quality assurance, constraints, or any other print parameters, directly to the print jobs without the user having to know the nuances of the print job, such as finishing, inspection, quality insurance, registry information, notification, and the like. As another example, a user can select a finishing type such as glossy, matte, foil, flat, etc, and the system can select the print parameters, sort the print job, and select a PSP in order to achieve the printing preference in accordance with the prioritization factor.

As has been described, in one aspect the plurality of print jobs can be sorted into alternative pluralities of print job groupings based, at least in part, on alternative groupings of common print parameters. The final print job groupings can then be selected according to the prioritization factor. In some cases, the user guided interface described above can be used to facilitate the selection of the final print job groupings through a series of directed questions.

Individual PSPs can have a variety of established printing configurations. Such configurations can be permanent configurations of a given service provider, or they can be temporary printing configurations. For example, a PSP that specializes in adhesive printing may be used for only adhesive printing. Alternatively, a PSP can provide a printing specialty or configuration to the backend interface that varies depending on various factors such as economic availability of resource materials, previous print job history, and the like. As these factors change, the printing configuration of the PSP may change. As another example, a given PSP may be low on work, so print job groupings that need to be printed in a timely manner can be sent to such a provider for faster turnaround.

PSPs can be configured for a variety of configurations, including, without limitation, photo printing, text printing, adhesive printing, specialty ink printing, and the like. Additionally, for some PSPs, established printing configurations can include the printing configurations of printers at a given PSP or they can include a printing configuration that represents a business focus of the PSP as a whole. For example, certain PSPs may specialize in specialty inks, or adhesives, and by sending such print job groupings to these providers can result in lower costs and better quality work.

Additionally, the user interface system can vary widely depending on the complexity of the print sorting system. In one aspect, for example, a predominantly automated system can merely receive the prioritization factor from the user and implement the retrieval of print jobs from the print server, sorting, grouping, and delivery to a PSP with little or any further interaction by the user. In another aspect, the user interface can query the print jobs on the print server and provide a series of questions as to how the print jobs are to be sorted. In some aspects, the prioritization factor can be generated by the user interface based on the answer to such questions. In other aspects, the user interface can present the user with a plurality of potential prioritization factors, either through an automated process or as a result of directed questioning, from which the prioritization factor or factors are selected. Regardless of how it is generated, the prioritization factor is sent to the sorting logic system to facilitate grouping of print jobs into print job groupings.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

What is claimed is:

1. A method of sorting print jobs for assignment to a plurality of print service providers, comprising:
    receiving at a print server a plurality of print jobs having a plurality of print parameters from a plurality of users, wherein individual print jobs have multiple print parameters being represented in a portion of the plurality of print jobs;
    determining the print parameters of the received print jobs;
    comparing the print parameters of the received print jobs with each other to determine which of the print parameters are common among the received print jobs;
    selecting a prioritization factor;
    grouping the received print jobs into a plurality of print job groupings according to the common print parameters and the prioritization factor;
    identifying a plurality of print service providers having at least partially different printing configurations;
    assigning each grouping to a print service provider of the plurality of print service providers; and
    sending each of the plurality of print job groupings to the assigned print service provider.

2. The method of claim 1, further comprising receiving individual printing configurations from individual print service providers.

3. The method of claim 1, further comprising receiving printing availability from individual print service providers.

4. The method of claim 1, further comprising printing the plurality of print job groupings by the plurality of print service providers.

5. The method of claim 1, further comprising receiving service offers from third parties.

6. The method of claim 5, wherein the service offers includes marketing services.

7. The method of claim 5, wherein the service offers includes offers for discounted printing materials.

8. The method of claim 1, wherein print parameters include a member selected from a group of print media, inks, toners, adhesives, coatings, and combinations thereof.

9. The method of claim 1, wherein different printing configurations include a member selected from a group of print job size, print media, inks, toners, adhesives, coatings, print time, cost, sustainability, and combinations thereof.

10. The method of claim 1, wherein the prioritization factor includes a member selected from a group of print job cost, print job time to completion, print job quality, print job size, print job sustainability, printing location, and combinations thereof.

11. The method of claim 1, further comprising:
    after the grouping of the received print jobs into the plurality of groupings, determining if a print job of the received print jobs is not assigned to one of the groupings; and
    in response to a determination that a print job is not assigned to one of the groupings, retaining the print job for subsequent assignment to a new grouping.

12. The method of claim 1, further comprising:
    after the grouping of the received print jobs into the plurality of groupings, determining if a print job of the received print jobs is not assigned to one of the groupings; and in response to a determination that a print job is not assigned to one of the groupings, returning the print job to the print server.

13. The method of claim 1, wherein the groupings comprise groupings determined from different sets of the common parameters and different prioritization factors.

14. The method of claim 1, wherein the grouping comprises:
identifying a first common parameter for at least two of the received print jobs from the comparing;
identifying a second common parameter for at least two other received print jobs from the comparing;
creating a first group for the first common parameter;
including the at least two received print jobs in the first group;
creating a second group for the second common parameter; and
including the at least two other received print jobs in the second group.

15. A system of sorting print jobs for assignment to a plurality of print service providers, comprising:
a print server;
a front end interface functionally coupled to the print server, the front end to receive a plurality of print jobs having a plurality of print parameters from a plurality of users, wherein individual print jobs have multiple print parameters represented in a portion of the plurality of print jobs;
a sorting logic system functionally coupled to the print server; and
a back end interface functionally coupled to the sorting logic system, the back end interface to receive printing configurations from a plurality of print service providers utilizing the back end interface,
wherein the sorting logic system is to determine the print parameters of the received print jobs, compare the print parameters of the received print jobs with each other to determine which of the print parameters are common among the received print jobs, group the received print jobs into a plurality of groupings according to the common print parameters and a prioritization factor, and assign each grouping to a print service provider of the plurality of print service providers.

16. The system of claim 15, wherein the sorting logic system is to communicate with the plurality of print service providers via an internet connection.

17. The system of claim 15, wherein the sorting logic system is to communicate with third party service providers via an internet connection.

18. A non-transitory computer readable medium storing machine readable instructions that when executed by a processor perform policing resources in a computing utility facility, the instructions comprising instructions to:
receiving at a print server a plurality of print jobs having a plurality of print parameters from a plurality of users, wherein individual print jobs have multiple print parameters being represented in a portion of the plurality of print jobs;
determining the print parameters of the received print jobs;
comparing the print parameters of the received print jobs with each other to determine which of the print parameters are common among the received print jobs;
selecting a prioritization factor;
grouping the received print jobs into a plurality of print job groupings according to the common print parameters and the prioritization factor;
identifying a plurality of print service providers having at least partially different printing configurations;
assigning each grouping to a print service provider of the plurality of print service providers; and
sending each of the plurality of print job groupings to the assigned print service provider.

19. The non-transitory computer readable medium of claim 18, wherein the prioritization factor includes print job cost, print job time to completion, print job quality, print job size, print job sustainability, printing location or combinations thereof.

20. The system of claim 15, wherein the prioritization factor includes print job cost, print job time to completion, print job quality, print job size, print job sustainability, or combinations thereof.

* * * * *